United States Patent [19]
Meyers et al.

[11] Patent Number: 6,032,810
[45] Date of Patent: Mar. 7, 2000

[54] ONE-PIECE NIPPLE/COLLAR FOR NURSERS AND THE LIKE

[75] Inventors: Brenda J. Meyers, Reedsburg; Mark A. Gilbertson, Sauk City; Edward A. Raleigh, Waunakee, all of Wis.; Mark S. Stowe, Fort Worth, Tex.

[73] Assignee: Gerber Products Company, Fremont, Mich.

[21] Appl. No.: 08/895,951

[22] Filed: Jul. 17, 1997

[51] Int. Cl.[7] .............................. A61J 11/02; A61J 11/04; B29C 45/16
[52] U.S. Cl. ........................ 215/11.1; 215/11.5; 264/273
[58] Field of Search ................................ 215/11.1, 11.5; 264/273

[56] References Cited

U.S. PATENT DOCUMENTS

| | | | |
|---|---|---|---|
| D. 371,848 | 7/1996 | Searles | D24/197 |
| 1,545,436 | 7/1925 | McGeary . | |
| 1,672,466 | 6/1928 | Oshman et al. | 215/11.1 X |
| 1,672,734 | 6/1928 | Reilly | 215/11.1 |
| 1,984,839 | 12/1934 | Murray . | |
| 2,060,212 | 11/1936 | Herstein | 215/11.1 |
| 2,655,920 | 10/1953 | Cronin | 128/252 |
| 2,736,446 | 2/1956 | Raiche | 215/11.5 |
| 2,825,479 | 3/1958 | Litzie | 215/11.5 |
| 3,190,288 | 6/1965 | Butler et al. | 215/11.5 |
| 3,193,125 | 7/1965 | Fischer | 215/11 |
| 3,645,413 | 2/1972 | Mitchell | 215/11 |
| 3,661,288 | 5/1972 | Noll | 215/11 |
| 3,787,993 | 1/1974 | Lyon | 40/306 |
| 3,858,741 | 1/1975 | Smith, Sr. | 215/216 |
| 4,006,836 | 2/1977 | Micallef | 215/217 |
| 4,832,214 | 5/1989 | Schrader et al. | 215/11.1 |
| 5,322,031 | 6/1994 | Lerner et al. | 116/204 |
| 5,544,766 | 8/1996 | Dunn et al. | 3/11.1 |
| 5,690,679 | 11/1997 | Prentiss | 215/11.6 X |

FOREIGN PATENT DOCUMENTS

| | | | |
|---|---|---|---|
| 1423524 | 11/1965 | France | 215/11.6 |
| 2700689 | 7/1994 | France | 215/11.1 |
| 2219909 | 3/1973 | Germany | 215/11.1 |
| 2264660 | 10/1990 | Japan | 315/11.1 |
| 419117 | 1/1992 | Japan | 215/11.1 |
| 2208291 | 3/1989 | United Kingdom | 215/11.1 |
| 8606273 | 11/1986 | WIPO | 215/11.1 |

*Primary Examiner*—Sue A. Weaver
*Attorney, Agent, or Firm*—Price, Heneveld, Cooper, DeWitt & Litton

[57] ABSTRACT

A one-piece nipple/collar includes a rigid collar having an exterior surface and an interior surface with a fastener thereon for detachably connecting the same with a nurser bottle or the like. A flexible nipple is molded over at least a portion of the exterior surface of the collar to form an integral, one-piece unit. The nipple extends along at least a portion of the exterior surface of the collar to a termination point that is spaced apart from the interior surface of the collar to avoid interference with the fastener.

11 Claims, 3 Drawing Sheets

ONE-PIECE NIPPLE/COLLAR FOR NURSERS AND THE LIKE

BACKGROUND OF THE INVENTION

The present invention relates to nursers and the like, and in particular to a one-piece nipple/collar therefor.

Nursers for infants, and other similar applications, are well-known in the art, and typically include a nipple that is detachably mounted on the neck of a nurser bottle by a separate, internally threaded collar. While such nurser constructions have proven quite effective, certain inconveniences still exist. For example, to properly clean the parts of a conventional nurser, the nipple must first be disassembled from the collar, so that all surfaces of the two separate parts can be thoroughly washed and sanitized. After the collar and nipple parts have been cleaned and disinfected, they must be reassembled prior to attaching the same to a nurser bottle. The additional handling associated with this process is both time consuming and tedious, and can also led to contamination of the nipple and/or collar during reassembly. The separate nurser parts are relatively small in size, thereby making the cleaning of the same even more difficult. When cleaning conventional nurser parts in an automatic dishwasher, the individual nurser nipples and collars tend to become displaced from their original position in the washer, and often drop to the bottom of the washer where they can be damaged by the heating coil. Since a separate nipple can be removed from its associated collar even when attached to a nurser bottle, inadvertent leakage can sometimes occur, and may even present a safety hazard under exceptional circumstances.

SUMMARY OF THE INVENTION

One aspect of the present invention is to provide a one-piece nipple/collar for nursers and the like, which includes a collar having an exterior surface and an interior surface with a fastener thereon for detachably connecting the same with a nurser bottle or the like. A flexible nipple is molded over at least a portion of the exterior surface of the collar to form an integral, one-piece unit. The nipple extends along at least a portion of the exterior surface of the collar to a termination point that is spaced apart from the interior surface of the collar to avoid interference with the fastener.

Preferably, the collar includes at least one interlocking portion positioned adjacent the exterior surface of the same, which is shaped to physically capture a portion of the nipple to ensure a secure interconnection between the collar and the nipple.

Another aspect of the present invention is a method for making one-piece nipple/collars for nursers and the like, which comprises providing a collar having an exterior surface and an interior surface with a fastener mechanism thereon for detachably connecting the nipple/collar with an associated nurser bottle. The method further includes molding a flexible nipple over at least a portion of the exterior surface of the collar to form an integral, one-piece construction therefor, wherein the nipple is molded to extend along at least a portion of the collar exterior surface to a termination point spaced apart from the interior surface of the collar, so as to avoid interference with the fastener mechanism. The method further includes forming an orifice in the nipple adjacent the normally uppermost portion thereof.

The principal objects of the present invention are to provide a one-piece nipple/collar which is more convenient to use, and is easier to clean. The one-piece nipple/collar includes a collar with an overmolded nipple that is securely interconnected to form an integral, one-piece construction that provides a spill resistant construction with improved child safety. The one-piece nipple/collar has an uncomplicated design, is efficient in use, economical to manufacture, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 9 is a fragmentary, enlarged, longitudinal cross-sectional view of the nipple/collar.

DETAILED DESCRIPTION OF THE PREFERRED EMBODIMENTS

Figure 1:
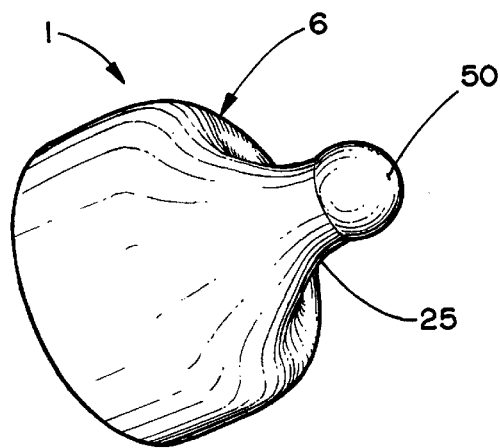
FIG. 1 is a perspective view of a one-piece nipple/collar embodying the present invention.
Figure 2:
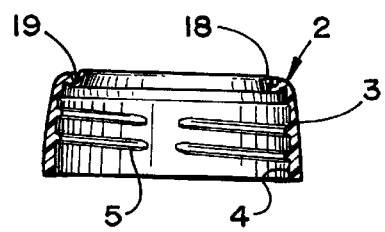
FIG. 2 is a longitudinal cross-sectional view of a collar portion of the nipple/collar.
Figure 3:
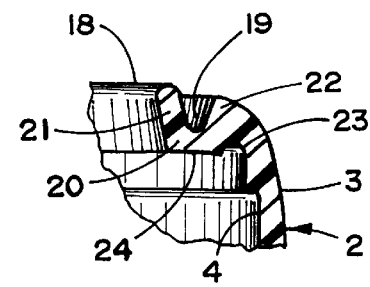
FIG. 3 is a fragmentary, enlarged view of an upper portion of the collar portion.
Figure 5:
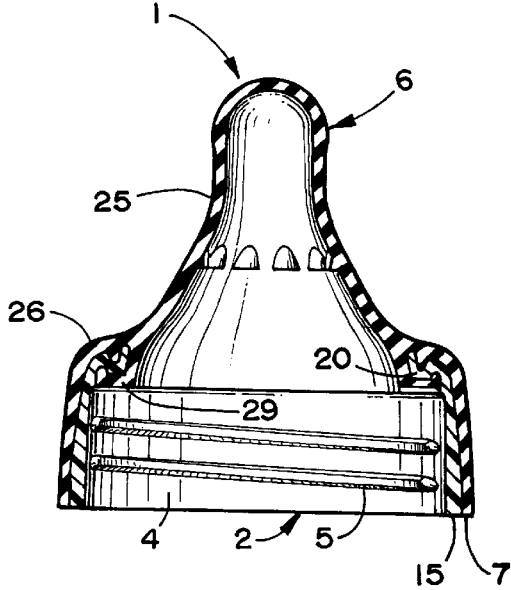
FIG. 5 is a longitudinal cross-sectional view of the nipple/collar.
Figure 4:
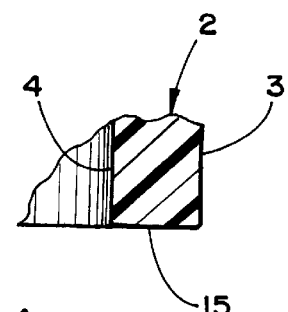
FIG. 4 is a fragmentary, enlarged view of a lower portion of the collar portion.
Figure 10:
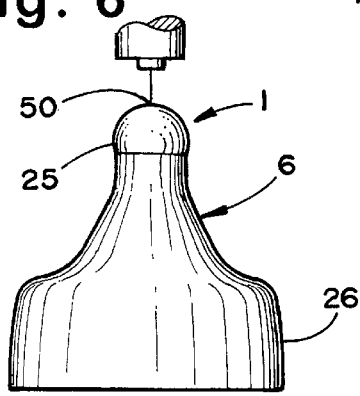
FIG. 10 is a partial schematic side elevational view of the nipple/collar, showing the forming of orifices in the upper portion of the nipple portion.
Figure 11:
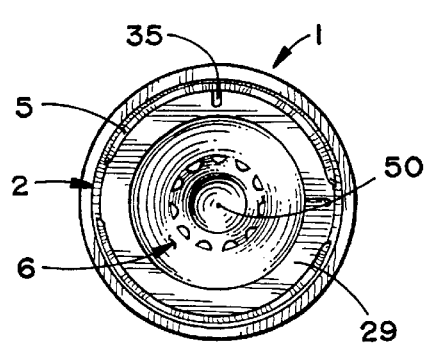
FIG. 11 is a bottom plan view of the nipple/collar.
Figure 12:
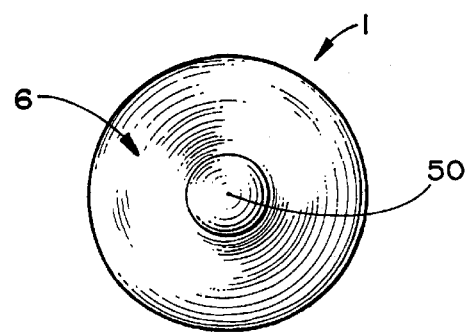
FIG. 12 is a top plan view of the nipple/collar.

For purpose of description herein, the terms "upper", "lower", "right", "left", "rear", "front", "vertical", "horizontal", and derivatives thereof shall relate to the invention as oriented in FIGS. 5 and 10. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 14:
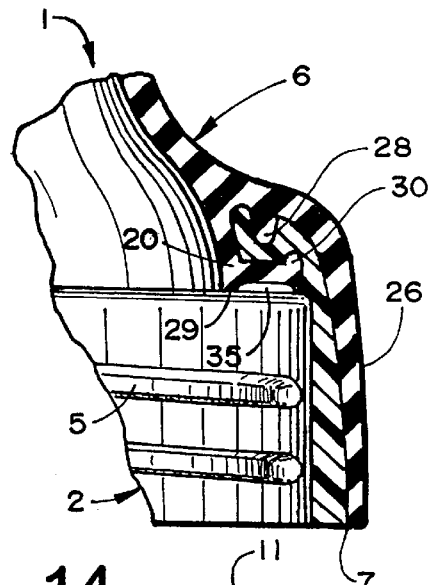
FIG. 14 is an enlarged, fragmentary, longitudinal cross-sectional view of the nipple/collar and an associated nurser bottle, particularly showing the vent.

The reference numeral 1 (FIGS. 1–5) generally designates a one-piece nipple and collar, or nipple/collar embodying the present invention. The illustrated nipple/collar 1 is particularly adapted for use in conjunction with nurser bottles (not shown), or other similar containers. One-piece nipple/collar 1 includes a collar 2 having an exterior side or surface 3 and an interior side or surface 4 with a fastener 5 thereon for detachably connecting the same with an associated nurser bottle 10 (FIG. 14). A flexible nipple 6 (FIGS. 1–5) is molded over at least a portion of the exterior surface 3 of collar 2 to form an integral, one-piece unit. The nipple 6 extends along at least a portion of the exterior surface 3 of collar 2 to a termination point 7 that is spaced apart from the interior surface 4 of collar 2 to avoid interference with the fastener 5.

Nipple/collar 1 may be provided in a wide variety of shapes and sizes to accommodate different applications, including conventional bottles, reusable and/or disposable nursers, and other similar drinking vessels, including children's training cups and the like. Furthermore, it is to be understood that flexible nipple 6 can assume different configurations and sizes depending upon the specific type of dispensing desired, and contemplates removable closures such as soft drinking spouts, and other similar infant and children liquid container designs.

The illustrated collar 2 (FIGS. 2–4) is constructed from a rigid synthetic material, and in the illustrated example, fastener 5 comprises conventional threads disposed on the interior surface 4 of collar 2. As described in greater detail below, rigid collar 2 preferably includes at least one interlocking portion that is positioned adjacent the exterior surface 3 of collar 2, and is shaped to physically capture a portion of nipple 6 to ensure a secure interconnection between collar 2 and nipple 6.

In one working embodiment of the present invention, collar 2 is constructed from a polypropylene copolymer, such as that material manufactured by Exxon Chemical Company under the trade name "Escorene". Proper matching of the materials for collar 2 and nipple 6 preferably results in a strong, heat fused bond between the same. In some cases, the bond may be sufficiently strong that mechanical interconnection of the collar 2 and nipple 6 is not required.

With reference to FIGS. 1–5, in the illustrated example, collar 2 includes a lower edge 15 disposed along and between a normally lowermost portion of the exterior surface 3 and interior surface 4. Lower edge 15 is disposed substantially perpendicular with interior surface 4.

Collar 2 also includes an upper edge 18 disposed along and between a normally uppermost portion of the exterior surface 3 and interior surface 4. A groove 19 is provided along the upper edge 18 of collar 2, and in the illustrated example is defined by a generally U-shaped ring portion 20 of collar 2. The opposite legs 21 and 22 of ring portion 20 are inclined with respect to the longitudinal or axial axis of collar 2, and in the illustrated example are positioned at a mutually included angle of around 20–40 degrees. An arcuate channel 23 is formed on the collar interior side 4, just outwardly of ring portion 20. The lowermost surface 24 of ring portion 20 is flat, and disposed generally perpendicular to the axial axis of collar 2, and assists in forming a leak resistant seal with an associated nurser bottle 10, as discussed more fully below. When nipple 6 is overmolded on collar 2, the nipple material is received into upper groove 19 and arcuate channel 23, so as to physically capture the nipple 6 on the collar 2 to ensure a secure interconnection therebetween, as described in greater detail hereinafter.

Figure 6:
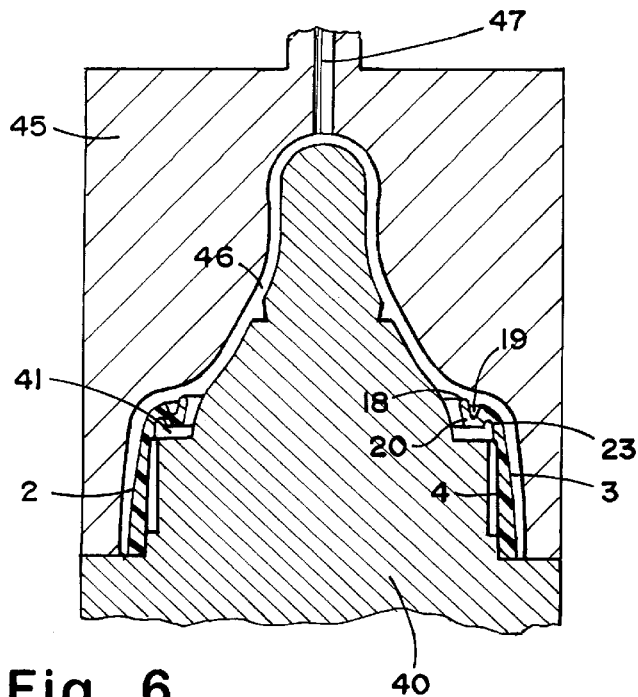
FIG. 6 is a partially schematic, longitudinal cross-sectional view of a mold for molding a flexible nipple portion over the collar portion.
Figure 7:
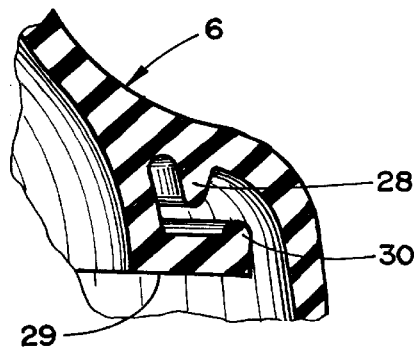
FIG. 7 is a fragmentary, enlarged view of an upper portion of a base area of the nipple portion.
Figure 8:
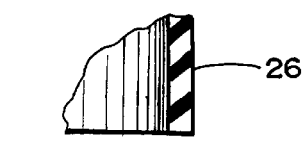
FIG. 8 is a fragmentary, enlarged view of a lower portion of the base area of the nipple portion.

The nipple 6 illustrated in FIGS. 1–12 includes a conventional shaped upper portion 25, and a uniquely shaped base area 26, which is molded over collar 2. As best illustrated in FIG. 7, when nipple 6 is overmolded onto collar 2, the upper portion of the base area 26 includes a depending ring or bead 28 that is closely received within the upper groove 19 of collar 2 to further interconnect the collar 2 and nipple 6. The illustrated nipple 6 also includes a flat sealing flange 29, which extends in a radially outward direction, overlying collar surface 24, and is configured to seal against a neck portion 11 of an associated nurser bottle 10 to form a tight liquid seal therebetween. The outermost portion of sealing flange 29 includes an upstanding rim or bead 30 that is closely received in channel 23 of collar 2 to further physically interconnect collar 2 and nipple 6.

In the nipple/collar 1 illustrated in FIGS. 1–12, nipple 6 extends along the entire exterior side 3 of collar 4 to the collar lower edge 15. However, it is to be understood that nipple 6 may extend over only a portion of the collar exterior side 3, such as about only the collar portion associated with upper ring 20. However, the overlap between nipple 6 and collar 4 must be sufficient to create a secure, leak-resistant interconnection therebetween.

Figure 13:
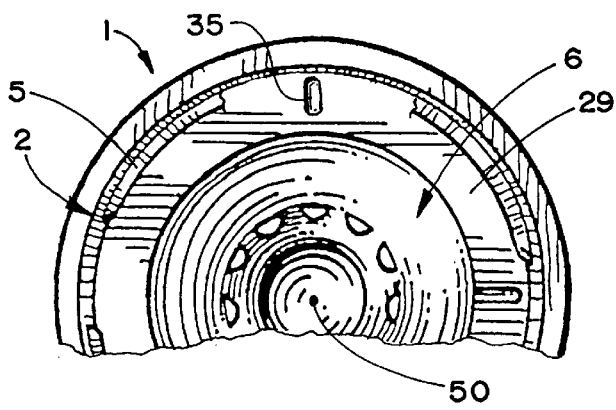
FIG. 13 is an enlarged, fragmentary, bottom plan view of the nipple/collar, with a portion thereof broken away to show a vent.

As best illustrated in FIGS. 13 and 14, a vent 35 may be provided on the interior of nipple/collar 1 to permit air to be sucked back into the nurser after dispensing. Vent 35 is in the form of a channel-shaped aperture extending radially outwardly along sealing flange 29 from a location adjacent the interior side of the sealing flange to a location adjacent the interior side 4 of collar 2. Vent 35 permits ambient air to be drawn back into the nurser bottle around collar threads 5.

It is to be understood that vent 35 is optional, since nipple 6 can be provided with enlarged dispensing orifices, or otherwise equipped to equalize the pressure in the nurser bottle. Vent 35 can also assume different shapes, and be positioned at various locations.

In one example of the present invention, nipple 6 is constructed from a clear thermoplastic elastomer, such as that marketed under the trade name synprene (RT-3850M) by Synergistics. It is to be understood that other similar materials can also be used to form nipple 6.

FIGS. 6–12 illustrate a method for making one-piece nipple collar 1 embodying the present invention. With reference to FIG. 6, a male mold member 40 is provided onto which a preformed collar 2 is positioned in the manner illustrated in FIG. 6. In general, male mold member 40 is shaped identical to the internal surface of the upper portion 25 of nipple 6. Male mold member 40 engages the interior surface 4 of collar 2 at a ledge portion 41 of the mold, which is spaced below the uppermost edge 18 of collar 2, so as to form the annularly shaped, sealing flange portion 29 of nipple 6. Male mold member 40 also engages the interior surface 4 of collar 2 adjacent the lower edge 15 to avoid the application of any nipple material onto the threads 5 of collar 2, which might interfere with the fastening of the same to an associated nurser bottle. A female mold member 45 mates with male mold member 40, and is disposed about collar 2. In general, female mold member 45 is shaped identical to the exterior surface of nipple/collar 1. A void or space 46 is formed between the male and female mold members 40 and 45, and defines the mold cavity, which communicates with a sprue 47 for injecting nipple material into the mold cavity 46. When mold members 40 and 45 are mated together for filling, as shown in FIG. 6, the nipple material flows through sprue 47 into the mold cavity 46 formed between mold members 40 and 45 to shape the finished nipple 6. The nipple material flows into the grooves 19 and 23 of collar 2, and also forms annular sealing flange 29 over collar surface 24. The nipple material adheres to the exposed surfaces of collar 2 to assist in interconnecting the same. The beads 28 and 30 formed in nipple 6 are captured in their associated collar grooves 19 and 23 respectively, to physically connect collar 2 and nipple 6 and ensure a secure interconnection therebetween.

The molded nipple/collar assembly 1 is then removed from the mold. At least one orifice 50 is then formed in the upper portion 25 of nipple 6 by means such as piecing or laser cutting or the like, as shown schematically in FIG. 10. Alternatively, orifice 50 may be molded into nipple 6 during the molding process discussed above.

Figure 15:
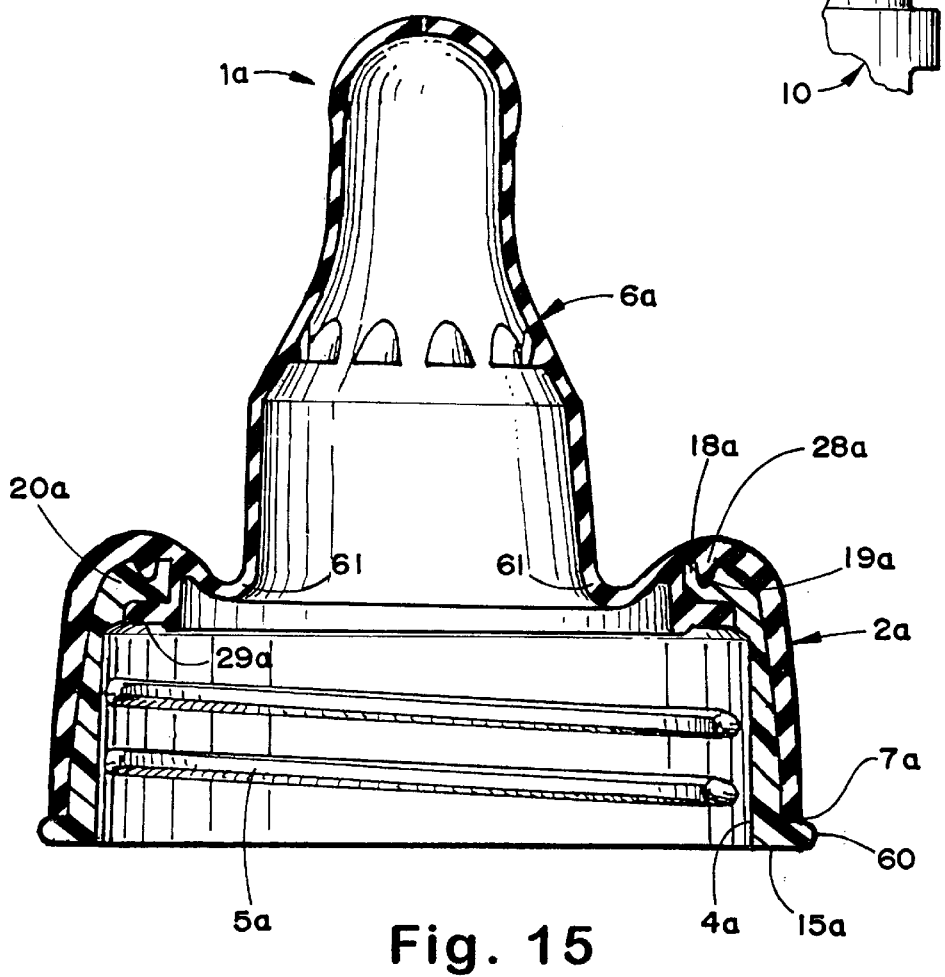
FIG. 15 is a longitudinal cross-sectional view of another embodiment of the present invention.

The reference numeral 1a (FIG. 15) generally designates another embodiment of the present invention, having a somewhat different configuration. Since nipple/collar 1a is similar to the previously described nipple/collar 1, similar parts appearing in FIGS. 1–14 and 15 respectively are represented by the same, corresponding reference numeral, except for the suffix "a" in the numerals of the latter.

In the illustrated nipple/collar 1a (FIG. 15), collar 2a has a ring 60 projecting radially outwardly about the lower edge 15a thereof to define a ledge against which abuts the lower termination point 7a of nipple 6a. Furthermore, nipple 6a has a J-shaped medial portion 61 which provides greater flexure to nipple 6a. The J-shaped medial portion 61 of nipple 6a functions like a bellows to better control the rate of fluid flow through orifice 50.

The completed one-piece nipple/collars 1 and 1a are more convenient to use and easier to clean. The nipples 6 and 6a are not only adhered to at least positions of the exterior surfaces of the collars, they are also physically captured on the associated collar to ensure a secure interconnection that provides improved child safety.

In the forgoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. A one-piece nipple/collar for nursers and the like, comprising:

a collar having an upper edge, a lower edge, an exterior surface and an interior surface with a fastener mechanism thereon for detachably connecting said nipple/collar with an associated nurser bottle; said collar provided with an interlocking portion that includes a ring portion outwardly disposed along the uppermost portions of said exterior and interior surfaces; and a flexible nipple molded over the exterior surface of said collar to form an integral, one-piece construction therefor and molded over said ring portion of said interlocking portion such that said collar physically captures a portion of said nipple to ensure a secure interconnection between said collar and said nipple; said nipple having an exterior portion extending along and covering said collar exterior surface to said lower edge of said collar at a spaced apart distance from the interior surface of said collar, so as to avoid interference with said fastener mechanism, and an interior portion extending along and covering a lower side of the upper edge of said collar to form an annular flange configured to seal against an associated neck portion of the nurser.

2. A nipple/collar as set forth in claim 1, wherein:

said annular flange includes a vent to permit air to enter the nurser bottle.

3. A nipple/collar as set forth in claim 2, wherein:

said ring portion of said interlocking portion defines a groove in said upper edge of said collar.

4. A nipple/collar as set forth in claim 3, wherein:

said groove has a generally U-shaped lateral cross-sectional shape.

5. A nipple/collar as set forth in claim 4, wherein:

said collar is constructed from polypropylene.

6. A nipple/collar as set forth in claim 5, wherein:

said nipple is constructed from synprene.

7. A nipple/collar as set forth in claim 1, wherein:

said ring portion of said interlocking portion defines a groove in said upper edge of said collar.

8. A nipple/collar as set forth in claim 1, wherein:

said nipple is constructed from synprene.

9. A method for making one-piece nipple/collars for nursers and the like, comprising:

providing a collar having an upper edge, a lower edge, an exterior surface and an interior surface with a fastener mechanism thereon for detachably connecting the nipple/collar with an associated nurser bottle, wherein the collar is provided with an interlocking portion that includes a ring portion outwardly disposed along the uppermost portions of said exterior and interior surfaces;

molding a flexible nipple over the exterior surface of the rigid collar to form an integral, one-piece construction therefor, wherein the nipple is molded over the ring portion of the interlocking portion such that the collar physically captures a portion of the nipple to ensure a secure interconnection between the collar and the nipple, and the nipple is molded to have an exterior portion extending along and covering the collar exterior surface to the lower edge of the collar at a spaced apart distance from the interior surface of the collar, so as to avoid interference with the fastener mechanism, and an interior portion extending along and covering a lower side of the upper edge of the collar to form an annular flange configured to seal against an associated neck portion of the nurser; and forming an orifice in the nipple adjacent a normally upper portion thereof.

10. A method as set forth in claim 9, including:

providing the annular flange with a vent to permit air to enter the nurser bottle.

11. A method as set forth in claim 9, including:

forming a groove in the upper edge of the collar disposed along a normally uppermost portion of the exterior surface to define the interlocking portion.

* * * * *